United States Patent
Qian et al.

(10) Patent No.: US 9,065,270 B2
(45) Date of Patent: Jun. 23, 2015

(54) GROUND FAULT PROTECTION SYSTEMS AND METHODS

(71) Applicant: Caterpillar Inc., Peoria, IL (US)

(72) Inventors: Lewei Qian, Peoria, IL (US); Jason John Smolarchuk, Germantown Hills, IL (US); Donald John Gilmore, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 186 days.

(21) Appl. No.: 13/777,265

(22) Filed: Feb. 26, 2013

(65) Prior Publication Data

US 2014/0240875 A1  Aug. 28, 2014

(51) Int. Cl.
*H02H 1/00* (2006.01)
*H02H 3/16* (2006.01)

(52) U.S. Cl.
CPC ............... *H02H 1/0092* (2013.01); *H02H 3/16* (2013.01)

(58) Field of Classification Search
CPC .............................. H02H 1/0092; H02H 3/16
USPC ........................................................... 361/42
See application file for complete search history.

(56) References Cited

U.S. PATENT DOCUMENTS

| | | |
|---|---|---|
| 4,608,619 A | 8/1986 | Bomer et al. |
| 4,870,527 A | 9/1989 | Zaleski |
| 5,774,316 A | 6/1998 | McGary et al. |
| 5,992,950 A * | 11/1999 | Kumar et al. ................. 303/151 |
| 7,334,158 B2 | 2/2008 | Bibikar et al. |
| 7,996,163 B2 | 8/2011 | Bailey et al. |
| 2005/0218830 A1 | 10/2005 | Yadlapalli |
| 2006/0181821 A1* | 8/2006 | McNally et al. ................ 361/42 |
| 2006/0255656 A1* | 11/2006 | Linebach et al. .......... 303/113.2 |
| 2008/0129308 A1 | 6/2008 | Lindsey et al. |
| 2009/0085575 A1 | 4/2009 | Lindsey et al. |
| 2009/0219656 A1 | 9/2009 | Lindsey |
| 2009/0257156 A1 | 10/2009 | Vicente et al. |
| 2011/0054713 A1 | 3/2011 | Giglio et al. |
| 2012/0016531 A1 | 1/2012 | Ganev et al. |
| 2012/0147508 A1 | 6/2012 | Starkweather |
| 2012/0153884 A1 | 6/2012 | Lindsey et al. |

FOREIGN PATENT DOCUMENTS

CA   1 266 117   2/1990

* cited by examiner

*Primary Examiner* — Thienvu Tran
*Assistant Examiner* — Kevin J Comber
(74) *Attorney, Agent, or Firm* — Finnegan, Henderson, Farabow, Garrett & Dunner, LLP

(57) ABSTRACT

A ground fault protection system may include a controller that is configured to receive signals representing a ground fault detection voltage and a DC link voltage of the machine. Based on the ground fault detection voltage and the DC link voltage, the controller may determine a ground fault detection percentage value, and a worst case component insulation voltage. The controller may compare an absolute value of the worst case component insulation voltage with a rated insulation voltage of a component of the machine. When the absolute value of the worst case component insulation voltage is higher than the rated insulation voltage, the controller may determine a new DC link voltage based on the rated insulation voltage and the ground fault detection percentage value, and may operate the machine by using the new DC link voltage.

20 Claims, 5 Drawing Sheets

GROUND FAULT PROTECTION SYSTEMS AND METHODS

TECHNICAL FIELD

The present disclosure relates generally to ground fault protection systems and methods and, more specifically, to ground fault protection systems and methods for protecting components of electric machines under ground fault conditions.

BACKGROUND

Electric- or hybrid-powered machines are widely used in various industrial applications. A high voltage power system is required for driving these machines. Typically, the machine frame will be electrically isolated from the terminals or conductors of the high voltage electrical components in the high voltage power system.

Under normal working conditions, leakage currents exist between the conductors of the high voltage power supply and the machine frame. Thus, the insulation resistances between the conductors of the high voltage power supply and the frame are normally very high. However, under faulty conditions (e.g., insulation failure), electric currents from the high voltage power supply may leak to the machine frame. Such leakage currents, when significant, may be an indication of machine component fatigue or failure of a conductor's insulation. In order to ensure the proper operating conditions and the integrity of the machines, it is necessary to protect the components of the machines under these faulty conditions.

An exemplary system that may be used to protect components of an electric machine under ground fault conditions is disclosed in Canadian Patent 1266117 to Kumar et al. that was issued on Feb. 20, 1990 ("the '117 patent"). The system in the '117 patent includes ground fault responsive means activated when the magnitude of ground leakage current is abnormally high. Specifically, when the leakage current rises to a magnitude higher than a predetermined duration threshold level but not higher than a predetermined maximum permissible limit, the system reduces output of a power source providing electric power to the electric machine to a fraction of its normally desired amount. The '117 patent explains that the fraction is inversely proportional to the leakage current magnitude in excess of the threshold level. When the leakage current magnitude rises above the maximum limit, the system restricts the power output to zero for at least a predetermined time interval. At the end of that interval, the system automatically removes the zero-power restriction if the leakage current magnitude is then below a certain reset point (which is appreciably lower than the maximum limit).

Although the system of the '117 patent may be useful in protecting components under ground fault conditions, the system of the '117 patent unnecessarily restricts the power output to zero when the ground leakage current magnitude rises above the maximum limit. In certain applications, it is desirable to move the electric machine under ground fault condition to a work shop so that the power supply system can be fixed. However, when the power output is restricted to zero, the electric machine cannot be moved.

The ground fault protection system of the present disclosure is directed toward solving the problem set forth above and/or other problems of the prior art.

SUMMARY

In one aspect, the present disclosure is directed to a system for protecting a machine under a ground fault condition. The system may include one or more memories storing instructions, and one or more processors configured to execute the instructions to receive signals representing a ground fault detection voltage and a DC link voltage of the machine, determine a ground fault detection percentage value based on the ground fault detection voltage and the DC link voltage, determine a worst case component insulation voltage based on the ground fault detection percentage value and the DC link voltage, and compare an absolute value of the worst case component insulation voltage with a rated insulation voltage of a component of the machine. When the absolute value of the worst case component insulation voltage is higher than the rated insulation voltage, the one or more processors may be configured to determine a new DC link voltage based on the rated insulation voltage and the ground fault detection percentage value, and output a signal for operating the machine by using the new DC link voltage.

In another aspect, the present disclosure is directed to a computer-implemented method for protecting a machine under a ground fault condition. The method may include receiving signals representing a ground fault detection voltage and a DC link voltage of the machine, determining, by a processor, a ground fault detection percentage value based on the ground fault detection voltage and the DC link voltage, determining, by the processor, a worst case component insulation voltage based on the ground fault detection percentage value and the DC link voltage, and comparing, by the processor, an absolute value of the worst case component insulation voltage with a rated insulation voltage of a component of the machine. When the absolute value of the worst case component insulation voltage is higher than the rated insulation voltage, the method may include determining, by the processor, a new DC link voltage based on the rated insulation voltage and the ground fault detection percentage value, and outputting a signal for operating the machine by using the new DC link voltage.

In still another aspect, the present disclosure is directed to a computer-readable storage device storing instructions for protecting a machine under a ground fault condition. The instructions may cause one or more computer processors to perform operations including determining a ground fault detection percentage value based on the ground fault detection voltage and the DC link voltage, determining a worst case component insulation voltage based on the ground fault detection percentage value and the DC link voltage, and comparing an absolute value of the worst case component insulation voltage with a rated insulation voltage of a component of the machine. When the absolute value of the worst case component insulation voltage is higher than the rated insulation voltage, the instructions may further cause the one or more computer processors to determine a new DC link voltage based on the rated insulation voltage and the ground fault detection percentage value, and outputting a signal for operating the machine by using the new DC link voltage.

DETAILED DESCRIPTION

Figure 1:
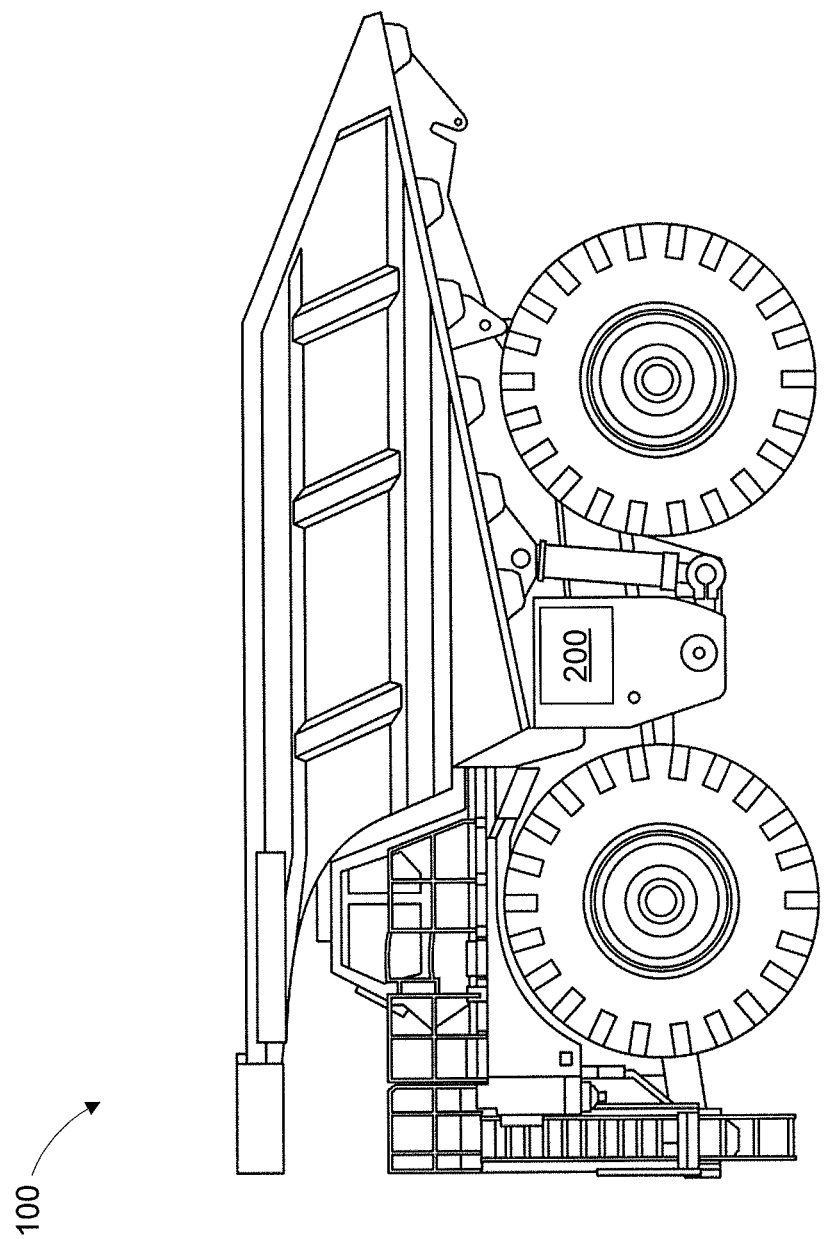
FIG. 1 is a schematic illustration of an exemplary machine consistent with certain disclosed embodiments.

FIG. 1 illustrates an exemplary disclosed machine 100 consistent with certain disclosed embodiments. Machine 100 may include, among other things, an electric drive system 200. Machine, as the term is used herein, refers to a fixed or mobile machine that may perform some type of operation associated with a particular industry, such as mining, construction, farming, etc. and operate between or within work environments (e.g., a construction site, mine site, power plant, etc.). A non-limiting example of a fixed machine includes an engine system operating in a plant or off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, on-highway vehicles, or any other type of movable machine that operates in a work environment.

Figure 2:
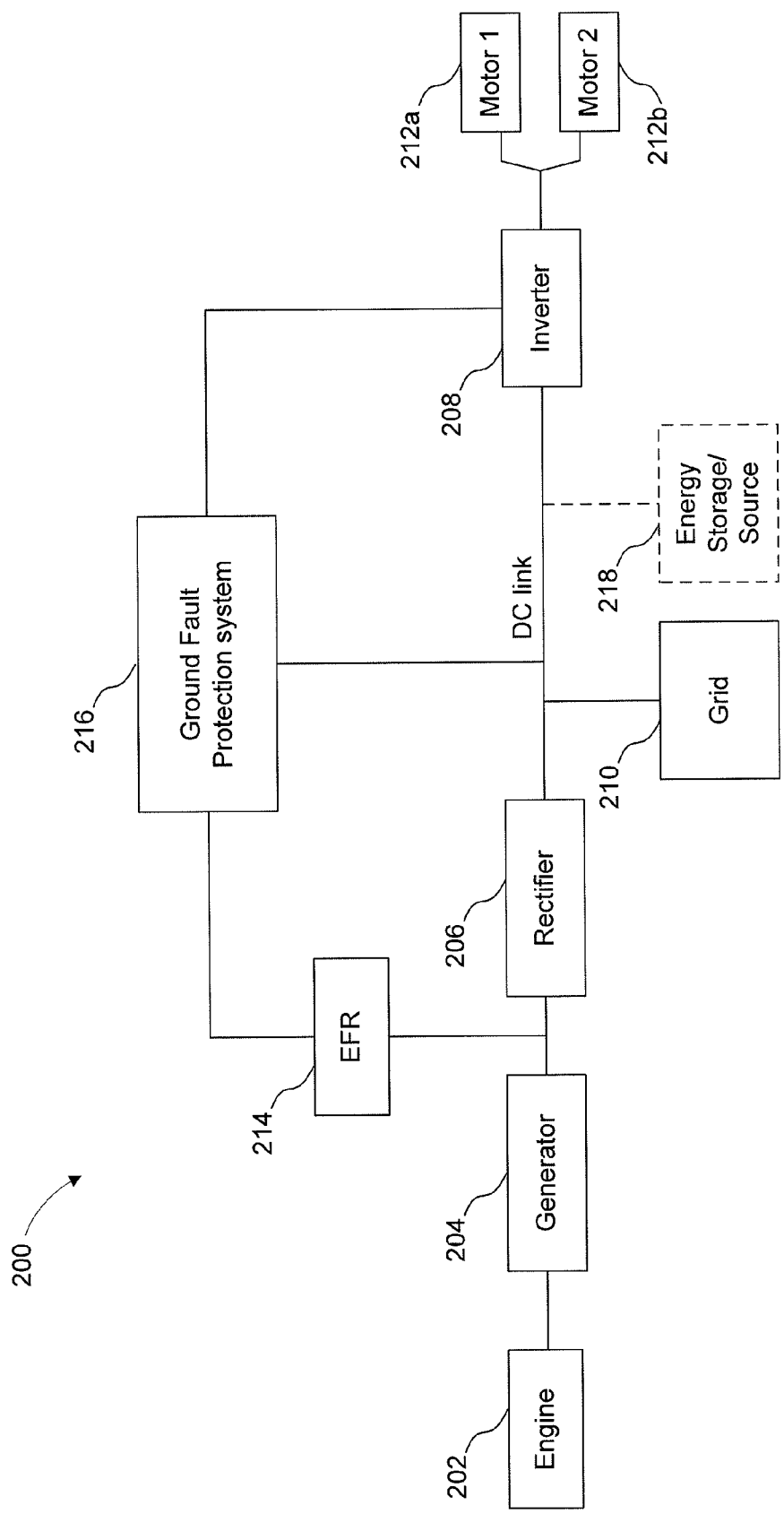
FIG. 2 is a schematic illustration of an electric drive system that may be included in the machine of FIG. 1.

FIG. 2 illustrates an exemplary disclosed electric drive system 200 consistent with certain disclosed embodiments. Electric drive system 200 may include various electrical components, devices, and wirings configured to generate, transfer, convert or consume high voltage electric power. High voltage, as the term is used herein, refers to a voltage that is higher than 50 volts. Referring to FIG. 2, electric drive system 200 may include an engine 202, a generator 204, a rectifier 206, an inverter 208, a grid 210, motors 212a and 212b, an exciter field regulator (EFR) 214, and a ground fault protection system 216.

In operation, an output shaft of engine 202 rotates a rotor of generator 204 to produce electrical power, for example, in the form of alternating current (AC) power. This electrical power is supplied to rectifier 206 and converted to direct current (DC) power. The DC power may be provided to a DC link to develop a DC link voltage. The rectified DC power may be converted again to an AC power by inverter 208. Inverter 208 may be capable of selectively adjusting the frequency and/or pulse-width of its output, such that motors 212a and 212b that are connected to an output of inverter 208 may be operated at variable speeds. Motors 212a and 212b may be connected via final assemblies (not shown) or directly to drive wheels of machine 100.

Engine 202 may be any type of device configured to produce mechanical power to drive generator 204. For example, engine 202 may be a diesel engine, a gasoline engine, a gaseous fuel-powered engine, or any other type of component operable to produce mechanical power. Generator 204 may be any type of component operable to generate electricity with mechanical power received from engine 202. Generator 204 may be, for example, a permanent-magnet electric machine, a switched reluctance electric machine, a DC electric machine, an induction-type machine or any other type of electric machine known in the art.

When machine 100 is retarding, the kinetic energy of the machine 100 is transferred into rotational power of the drive wheels that rotates motors 212a and 212b, which act as electrical generators. The electrical power generated by motors 212a and 212b may be rectified by inverter 208 into DC power. Grid 210, for example, a resistive grid, may be connected to the DC link via a switch (not shown) to dissipate the DC power generated by motors 212a and 212b.

EFR 214 may control a field current in generator 204, which controls an electric power output from generator 204. Since the DC link voltage is generated by the electric power from generator 204, EFR 214 may control the DC link voltage.

In some embodiments, electric drive system 200 may further include an energy storage/source 218 coupled to the DC link to store energy supplied by motors 212a and 212b and generator 204, and to provide electrical energy to drive electric motors 212a and 212b. Energy storage/source 218 may include one or more of batteries or cells capable of storing electrical energy, for example.

Ground fault protection system 216 may include components that cooperate to gather information from machine 100 during operation of machine 100. For example, ground fault protection system 216 may include various sensors, e.g., voltage sensors, current sensors, etc., that may be used to measure, e.g., electrical voltage, electrical current, etc. Ground fault protection system 216 may also include any combination of hardware and/or software capable of executing one or more computer programs that may include algorithms to process the measurements made by the various sensors, e.g., as discussed in greater detail below. Ground fault protection system 216 may further include control means to control the operation of machine 100.

Figure 3:
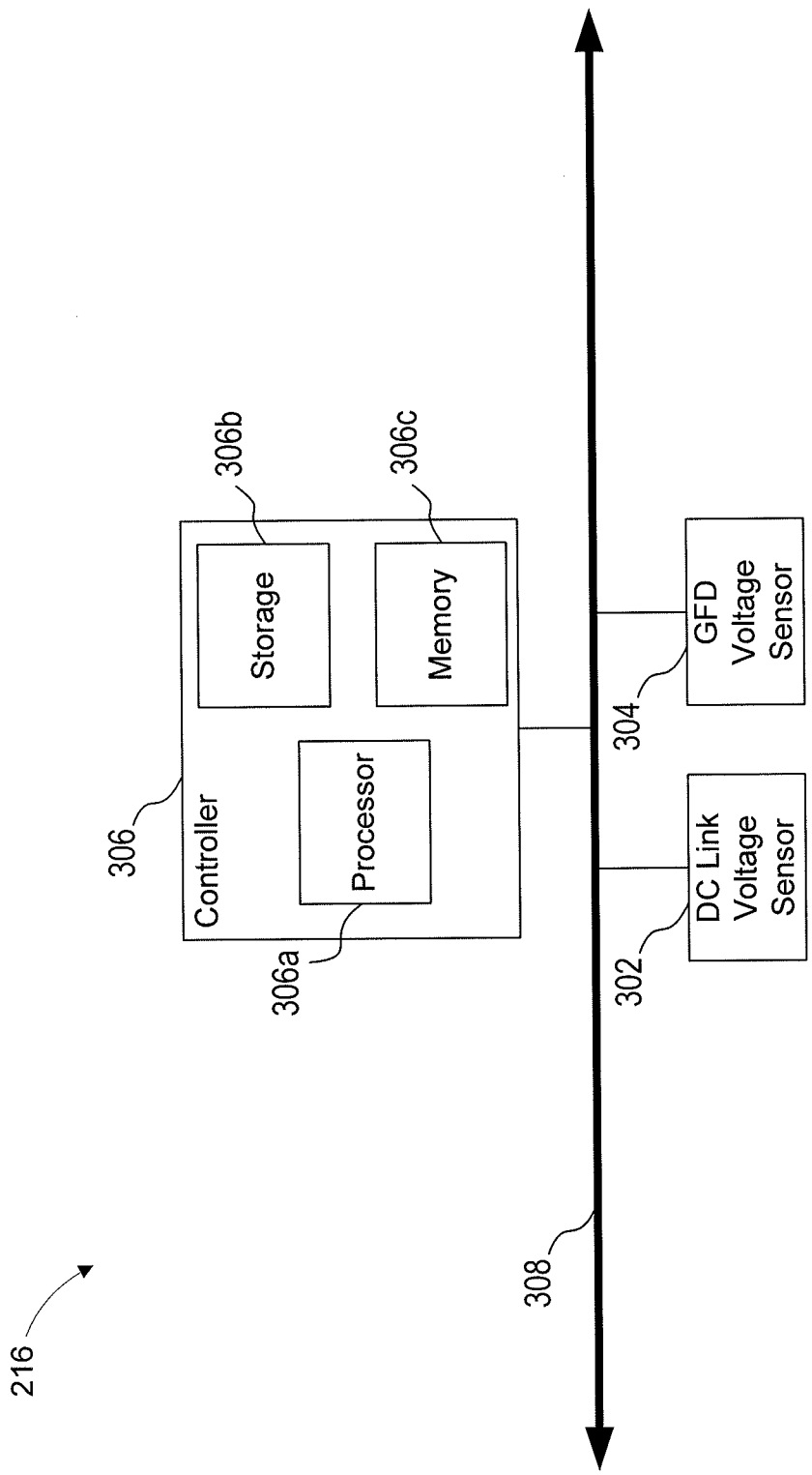
FIG. 3 is a schematic illustration of a ground fault protection system that may be included in the electric drive system of FIG. 2.

FIG. 3 illustrates an exemplary ground fault protection system 216 that may be used in conjunction with machine 100. Ground fault protection system 216 may include a DC link voltage sensor 302, a ground fault detection (GFD) voltage sensor 304, and a controller 306 connected to each other via data bus 308. While a data bus architecture is shown in FIG. 3, any suitable architecture may be used, including any combination of wired and/or wireless networks. Additionally, such networks may be integrated into any local area network, wide area network, and/or the Internet.

DC link voltage sensor 302 may be coupled to the DC link to measure a DC link voltage defined as a difference between a DC positive potential and a DC reference potential. In some embodiment, the DC reference potential may be the electrical potential of a frame of machine 100. DC link voltage sensor 302 may output a signal representative of the DC link voltage to controller 306 via data bus 308.

GFD voltage sensor 304 may be coupled to the DC link to detect a GFD voltage. For example, GFD voltage sensor 304 may detect a leakage current when machine 100 is under a ground fault condition. GFD voltage sensor 304 may measure a voltage across a burden resistor (not shown) through which the leakage current is flowing. The measured voltage may be defined as the GFD voltage. GFD voltage sensor 304 may output a signal representative of the GFD voltage to controller 306 via data bus 308.

Controller 306 may include processor 306a, storage 306b, and memory 306c, included together in a single device and/or provided separately. Processor 306a may include one or more known processing devices, such as a microprocessor from the Pentium™ or Xeon™ family manufactured by Intel™, the Turion™ family manufactured by AMD™, or any other type of processor. Memory 306c may include one or more storage devices configured to store information used by controller 306 to perform certain functions related to disclosed embodiments. Storage 306b may include a volatile or non-volatile, magnetic, semiconductor, tape, optical, removable, nonremovable, or other type of storage device or computer-readable medium. Storage 306b may store programs and/or other information, such as information related to processing data received from one or more sensors, as discussed in greater detail below.

In one embodiment, storage 306b may store a map correlating each of a plurality of worst case component insulation voltages to a combination of one of a plurality of ground fault detection percentage values and one of a plurality of DC link voltages. Memory 306c may include one or more ground fault protection programs or subprograms loaded from storage 306b or elsewhere that, when executed by processor 306a, perform various procedures, operations, or processes consistent with disclosed embodiments. For example, memory 306c may include one or more programs that enable controller 306a to, among other things, collect data from DC link voltage sensor 302 and GFD voltage sensor 304, process the data according to disclosed embodiments such as those embodiments discussed with regard to FIGS. 4 and 5, and protect the components of machine 100 if a ground fault is detected.

Figure 4:
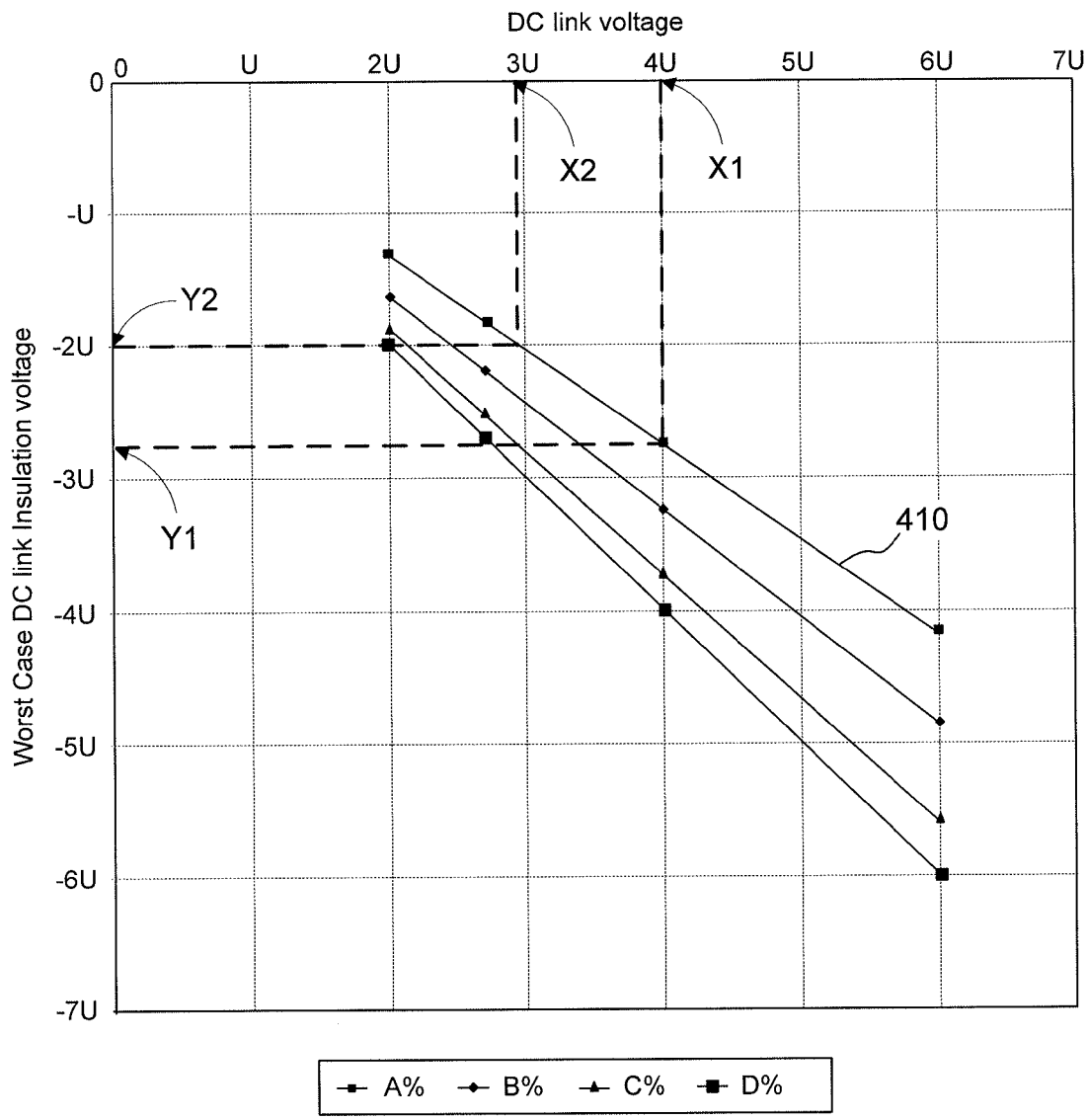
FIG. 4 is a graphical illustration of exemplary correlations between each of a plurality of worst case component insulation voltages and one of a plurality of DC link voltages at different ground fault detection percentage values, consistent with certain disclosed embodiments.

FIG. 4 is a graphical illustration of an exemplary map that may be stored in storage 306b to correlate each of a plurality of worst case component insulation voltages to one of a plurality of DC link voltages at different ground fault detection percentage values, that may be obtained according to embodiments of the present disclosure. The "worst case component insulation voltage," as used herein, refers to a voltage stress that components in machine 100 are experiencing under a ground fault condition. In FIG. 4, the worst case component insulation voltages and the DC link voltages are represented in a generic unit, U. The unit U may be varied based on different applications of machine 100. For example, U may be 100V, 300V, or any other unit of voltage. In an exemplary embodiment, when a ground fault detection percentage value is A % (line 410 in FIG. 4), and a DC link voltage is 4 U (X1 in the X-axis), the worst case component insulation voltage is approximately −2.7 U (Y1 in the Y-axis). Therefore, the components in machine 100 are experiencing a voltage stress of −2.7 U. When a rated insulation voltage of one of the components is 2 U, the component may be damaged. On the other hand, when the rated insulation voltage of the component in machine 100 is 3 U, the component may still function properly. The "rated insulation voltage," as used herein, refers to a maximum voltage stress that a component can withstand. The correlation as shown in FIG. 4 may be established through physical experiments or computer simulation.

INDUSTRIAL APPLICABILITY

The disclosed ground fault protection system 216 may be applicable to any machine where ground fault protection of the machine's electric components is desired. The operation of controller 306 in ground fault protection system 216 will now be described in connection with the flowchart of FIG. 5.

Figure 5:
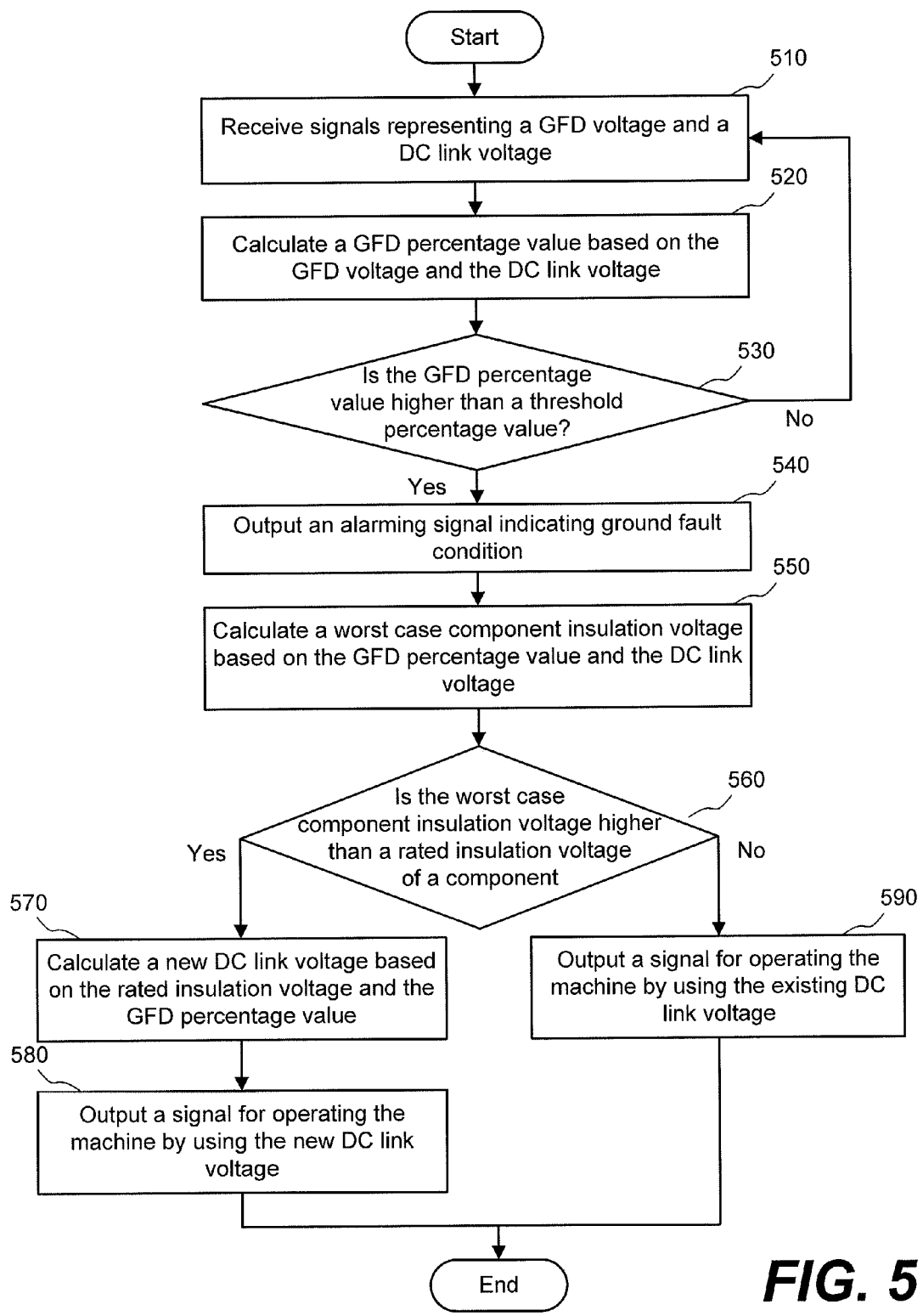
FIG. 5 is a flowchart depicting an exemplary method of protecting components under a ground fault condition that may be performed by the ground fault protection system of FIG. 3.

As shown in FIG. 5, controller 306 may receive signals representing a GFD voltage and a DC link voltage from DC link voltage sensor 302 and GFD voltage sensor 304, respectively (step 510). Controller 306 may calculate a GFD percentage value through a certain algorithm based on the GFD voltage and the DC link voltage (step 520). For example, controller 306 may divide the GFD voltage by the DC link voltage to obtain the GFD percentage value.

Controller 306 may determine whether the GFD percentage value is higher than a threshold percentage value (step 530). When the GFD percentage value is higher than the threshold percentage value (step 530, Yes), controller 306 may output an alarming signal indicating that machine 100 is under a ground fault condition (step 540). When the GFD percentage value is lower than the threshold percentage value (step 530, No), the process may return to step 510 where controller 306 may receive additional signals representing a GFD voltage and a DC link voltage.

In certain embodiments, controller 306 may compare the GFD percentage value with more than one threshold percentage value, and determine system reactions based on the comparison. For example, when the GFD percentage value is less than 40%, controller 306 may determine that the ground fault leakage is acceptable and no indication will be activated. When the GFD percentage value is between 40% and 60%, controller 306 determined that a level 2 ground fault event will be activated. Ground fault leakage at this level may not damage the components in machine 100, but may require attention if the level 2 ground fault event remains active for a long time period such as, for example, several hours. When the GFD percentage is larger than 60%, controller 306 determined that a level 3 ground fault event will be activated. Ground fault leakage at level 3 could damage components in the system. Conventionally, when the level 3 ground fault event is activated, the operation of the machine is shutdown. However, when the machine is a mining truck in mine site, even when the level 3 ground fault event occurs, the mining truck still needs to operate, for example, to move back to a workshop to diagnose the problem with the system.

In the disclosed embodiments, controller 306 may calculate a worst case component insulation voltage based on the GFD percentage value and the DC link voltage (step 550). Controller 306 may determine whether an absolute value of the worst case component insulation voltage is higher than a rated insulation voltage of a component in machine 100 (step 560). When the absolute value of the worst case component insulation voltage is higher than the rated insulation voltage (step 560, Yes), controller 306 may calculate a new DC link voltage based on the rated insulation voltage and the GFD percentage value (step 570).

For example, referring back to FIG. 4, when a ground fault detection percentage value is A % (line 410), and a DC link voltage 4 U (X1 in the X-axis), the worst case component insulation voltage is approximately −2.7 U (Y1 in the Y-axis). Therefore, the components in machine 100 are experiencing a voltage stress of −2.7 U. When a rated insulation voltage of one of the components is 2 U, controller 306 may calculate a new DC link voltage based on the rated insulation voltage of 2 U and the ground fault detection percentage value of A %. To do so, controller 306 may refer to the rated insulation voltage of 2 U as the absolute value of the worst case component insulation voltage (Y2 in the Y-axis), and determine the new DC link voltage to be approximately 2.9 U (X2 in the X-axis).

After calculating the new DC link voltage, controller 306 may output a signal for operating machine 100 by using the new DC link voltage (step 580). For example, controller 306 may output a signal to instruct EFR 214 to reduce the generator field current, thus reducing the generator output voltage. Therefore, the DC link voltage may be reduced to a desired value. Alternatively, controller 306 may output a signal to turn on the switch to connect grid 210 to the DC link, thus reducing the DC link voltage. In some embodiments, the signal for operating machine 100 by using the new DC link voltage may include moving machine 100 to the work shop by using the new DC link voltage.

When the absolute value of the worst case component insulation voltage is lower than the rated insulation voltage (step 560, No), controller 306 may output a signal for operating machine 100 by using the existing DC link voltage (step 590). For example, controller may output a signal to move machine 100 to the work shop by using the existing DC link voltage.

In some embodiments, when there are a plurality of components in machine 100, controller 306 may compare the absolute value of the worst case component insulation voltage with a minimum rated insulation voltage among rated insulation voltages of the plurality of the components. When the absolute value of the worst case component insulation voltage is higher than the minimum rated insulation voltage, controller 306 may determine the new DC link based on the minimum rated insulation voltage and the ground fault detection percentage value.

According to the above embodiments, the disclosed ground fault protection system 216 determines a new DC link voltage under a ground fault condition when a component in machine 100 is experiencing a voltage stress that it cannot withstand, and adjusts the DC link voltage to be the new DC link voltage. Therefore, the disclosed ground fault protection system 216 allows for operating machine 100, e.g., moving machine 100 to a work shop, without damaging the components in machine 100, even when machine 100 is under the ground fault condition.

It will be apparent to those skilled in the art that various modifications and variations can be made to the disclosed ground fault protection system. Other embodiments will be apparent to those skilled in the art from consideration of the specification and practice of the disclosed ground fault protection system. It is intended that the specification and examples be considered as exemplary only, with a true scope being indicated by the following claims and their equivalents.

What is claimed is:

1. A system for protecting a machine under a ground fault condition, comprising:
   one or more memories storing instructions; and
   one or more processors configured to execute the instructions to:
   receive signals representing a ground fault detection voltage and a DC link voltage of the machine;
   determine a ground fault detection percentage value based on the ground fault detection voltage and the DC link voltage;
   determine a worst case component insulation voltage based on the ground fault detection percentage value and the DC link voltage;
   compare an absolute value of the worst case component insulation voltage with a rated insulation voltage of a component of the machine; and
   when the absolute value of the worst case component insulation voltage is higher than the rated insulation voltage, determine a new DC link voltage based on the rated insulation voltage and the ground fault detection percentage value, and operate the machine by using the new DC link voltage.

2. The system of claim 1, wherein the one or more processors are further configured to:
   when the absolute value of the worst case component insulation voltage is higher than the rated insulation voltage, output a signal for operating the machine by using the DC link voltage.

3. The system of claim 1, wherein the one or more processors are further configured to:
   compare the ground fault detection percentage value with a threshold percentage value.

4. The system of claim 3, wherein the one or more processors are further configured to:
   determine the worst case component insulation voltage and compare the absolute value of the worst case component insulation voltage with the rated insulation voltage only when the ground fault detection percentage value is higher than the threshold percentage value.

5. The system of claim 4, wherein the one or more processors are further configured to:
   output an alarming signal indicating that the machine is under a ground fault condition when the ground fault detection percentage value is higher than the threshold percentage value.

6. The system of claim 1, wherein
   the machine includes a plurality of components, and
   the one or more processors are further configured to:
   compare the absolute value of the worst case component insulation voltage with a minimum rated insulation voltage among a plurality of rated insulation voltages of the plurality of the components; and
   determine the new DC link voltage based on the minimum rated insulation voltage and the ground fault detection percentage value when the absolute value of the worst case component insulation voltage is higher than the minimum rated insulation voltage.

7. The system of claim 1, wherein the one or more processors are further configured to:
   determine the worst case component insulation voltage by retrieving the worst case component insulation voltage from a map based on the ground fault detection percentage value and the DC link voltage, the map correlating each of a plurality of worst case component insulation voltages to a combination of one of a plurality of ground fault detection percentage values and one of a plurality of DC link voltages.

8. The system of claim 7, wherein the one or more processors are further configured to:
   determine the new DC link voltage by retrieving the new DC link voltage from the map based on the rated insulation voltage and the ground fault detection percentage value.

9. The system of claim 7, wherein the map is established through physical experiments or computer simulation.

10. The system of claim 7, wherein the map is stored in a non-volatile memory.

11. The system of claim 1, wherein the one or more processors are further configured to:
    when the absolute value of the worst case component insulation voltage is higher than the rated insulation voltage, output a signal for moving the machine to a work shop by using the new DC link voltage.

12. A computer-implemented method for protecting a machine under a ground fault condition, comprising:
    receiving signals representing a ground fault detection voltage and a DC link voltage of the machine;
    determining, by a processor, a ground fault detection percentage value based on the ground fault detection voltage and the DC link voltage;
    determining, by the processor, a worst case component insulation voltage based on the ground fault detection percentage value and the DC link voltage;
    comparing, by the processor, an absolute value of the worst case component insulation voltage with a rated insulation voltage of a component of the machine; and
    when the absolute value of the worst case component insulation voltage is higher than the rated insulation voltage, determining, by the processor, a new DC link voltage based on the rated insulation voltage and the ground fault detection percentage value, and operating the machine by using the new DC link voltage.

13. The method of claim 12, further including:
when the absolute value of the worst case component insulation voltage is higher than the rated insulation voltage, outputting a signal for operating the machine by using the DC link voltage.

14. The method of claim 12, further including:
comparing the ground fault detection percentage value with a threshold percentage value.

15. The method of claim 14, further including:
determining the worst case component insulation voltage and comparing the absolute value of the worst case component insulation voltage with the rated insulation voltage only when the ground fault detection percentage value is higher than the threshold percentage value.

16. The method of claim 14, further including:
outputting an alarming signal indicating that the machine is under a ground fault condition when the ground fault detection percentage value is higher than the threshold percentage value.

17. The method of claim 12, wherein the machine includes a plurality of components, and the method further including:
comparing the absolute value of the worst case component insulation voltage with a minimum rated insulation voltage among a plurality of rated insulation voltages of the plurality of the components; and
determine the new DC link based on the minimum rated insulation voltage and the ground fault detection percentage value when the absolute value of the worst case component insulation voltage is higher than the minimum rated insulation voltage.

18. The method of claim 12, further including:
determining the worst case component insulation voltage by retrieving the worst case component insulation voltage from a map based on the ground fault detection percentage value and the DC link voltage, the map correlating each of a plurality of worst case component insulation voltages to a combination of one of a plurality of ground fault detection percentage values and one of a plurality of DC link voltages.

19. The method of claim 18, further including:
determining the new DC link voltage by retrieving the new DC link voltage from the map based on the rated insulation voltage and the ground fault detection percentage value.

20. A non-transitory computer-readable storage device storing instructions for protecting a machine under a ground fault condition, the instructions causing one or more computer processors to perform operations comprising:
receiving signals representing a ground fault detection voltage and a DC link voltage of the machine;
determining a ground fault detection percentage value based on the ground fault detection voltage and the DC link voltage;
determining a worst case component insulation voltage based on the ground fault detection percentage value and the DC link voltage;
comparing an absolute value of the worst case component insulation voltage with a rated insulation voltage of a component of the machine; and
when the absolute value of the worst case component insulation voltage is higher than the rated insulation voltage, determining a new DC link voltage based on the rated insulation voltage and the ground fault detection percentage value, and for operating the machine by using the new DC link voltage.

\* \* \* \* \*